United States Patent
Emmersberger et al.

(10) Patent No.: US 10,876,442 B2
(45) Date of Patent: Dec. 29, 2020

(54) VALVE DRIVE FOR AN INTERNAL COMBUSTION ENGINE

(71) Applicant: Bayerische Motoren Werke Aktiengesellschaft, Munich (DE)

(72) Inventors: Georg Emmersberger, Pfaffing (DE); Dietmar Knoll, Feldkirchen (DE); Roland Kraft, Unterschleissheim (DE); Rudolf Schmid, Riemerling (DE); Thomas Steinle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/774,084

(22) Filed: Jan. 28, 2020

(65) Prior Publication Data

US 2020/0157984 A1 May 21, 2020

Related U.S. Application Data

(63) Continuation of application No. PCT/EP2018/068926, filed on Jul. 12, 2018.

(30) Foreign Application Priority Data

Aug. 24, 2017 (DE) .......................... 10 2017 214 794

(51) Int. Cl.
*F01M 9/10* (2006.01)
*F01L 1/047* (2006.01)
(Continued)

(52) U.S. Cl.
CPC ............. *F01M 9/102* (2013.01); *F01L 1/047* (2013.01); *F01L 13/0036* (2013.01); *F01M 1/06* (2013.01);
(Continued)

(58) Field of Classification Search
CPC ....... F01L 1/047; F01L 13/0036; F01L 13/00; F01L 2810/02; F01L 2013/0052;
(Continued)

(56) References Cited

U.S. PATENT DOCUMENTS 5,161,495 A * 11/1992 Saito ....................... F01L 1/053
123/90.33
2016/0123198 A1   5/2016 Beyer et al.

FOREIGN PATENT DOCUMENTS

DE          196 11 641 C1    6/1997
DE    10 2004 021 376 A1   12/2005
(Continued)

OTHER PUBLICATIONS

International Search Report (PCT/ISA/210) issued in PCT Application No. PCT/EP2018/068926 dated Sep. 6, 2018 with English translation (five pages).

(Continued)

*Primary Examiner* — Zelalem Eshete
(74) *Attorney, Agent, or Firm* — Crowell & Moring LLP

(57) ABSTRACT

A valve drive for a cylinder head of an internal combustion engine has a camshaft which is rotatably mounted in a first and a second camshaft bearing and which includes at least one cam with a first cam curve and a second cam curve that differs from the first cam curve. A gas exchange valve can be actuated by the first or the second cam curve via a cam follower. A camshaft section is provided, by which the cam can be moved by an actuator such that the gas exchange valve can be actuated either via the first or the second cam curve via the cam follower. The camshaft and the cam have a fixed position relative to each other. The camshaft can be axially moved in the first and the second camshaft bearing. The camshaft bearings consist of a camshaft bearing block and a common bearing frame. A lubricant supply bore is provided which opens into a fourth lubricant groove in the (Continued)

bearing frame in order to supply the bearing points with lubricant. A first lubricant groove is provided in the first camshaft bearing block, and a second lubricant groove is provided in the second camshaft bearing block. These lubricant grooves correspond to the fourth lubricant groove and are open in the direction of the cam follower.

3 Claims, 2 Drawing Sheets

(51) Int. Cl.
    *F01L 13/00*     (2006.01)
    *F01M 1/06*     (2006.01)
    *F16C 33/10*     (2006.01)

(52) U.S. Cl.
    CPC ... *F16C 33/1065* (2013.01); *F01L 2001/0476* (2013.01); *F01M 2001/064* (2013.01); *F16C 2360/18* (2013.01)

(58) Field of Classification Search
    CPC .. F16C 35/02; F16C 33/1065; F16C 2360/18; F01M 9/10; F01M 9/102; F01M 1/06; F01M 2001/064; F01M 2001/0476
    See application file for complete search history.

(56) References Cited

FOREIGN PATENT DOCUMENTS

| DE | 10 2013 111 410 A1 | 4/2015 |
|----|---------------------|--------|
| DE | 10 2014 220 385 A1 | 10/2015 |
| DE | 10 2016 200 325 A1 | 7/2017 |
| WO | WO 2012/040553 A2 | 3/2012 |

OTHER PUBLICATIONS

German-language Written Opinion (PCT/ISA/237) issued in PCT Application No. PCT/EP2018/068926 dated Sep. 6, 2018 (five pages).

German-language Search Report issued in counterpart German Application No. 10 2017 214 794.6 dated Mar. 16, 2018 with partial English translation (11 pages).

\* cited by examiner

VALVE DRIVE FOR AN INTERNAL COMBUSTION ENGINE

CROSS REFERENCE TO RELATED APPLICATIONS

This application is a continuation of PCT International Application No. PCT/EP2018/068926, filed Jul. 12, 2018, which claims priority under 35 U.S.C. § 119 from German Patent Application No. 10 2017 214 794.6, filed Aug. 24, 2017, the entire disclosures of which are herein expressly incorporated by reference.

BACKGROUND AND SUMMARY OF THE INVENTION

The invention relates to a valve drive for a cylinder head of an internal combustion engine.

Regarding the technical field, attention is drawn to German Laid-Open Application DE 10 2014 220 385 A1, for example. This document discloses a switchable valve drive for a reciprocating piston internal combustion engine, having at least one cam follower of lever-type design, which is arranged pivotably on a lever pivot and can be moved in the axial direction of the lever pivot. The lever pivot is arranged so as to run parallel to a camshaft in a camshaft bearing housing. The cam follower, which interacts with one end of the valve stem of a gas exchange valve, can be brought at least indirectly into contact with different cam profiles of at least two cams, which are part of at least one cam group. The at least one cam follower is fixed in the lever pivot in the axial direction. The lever pivot is arranged in such a way as to be movable in the longitudinal direction in the camshaft bearing housing, and at least one driver provided on the lever pivot can be brought into engagement with at least one control contour, which is provided on the camshaft and which extends obliquely or in the manner of a curve relative to a transverse plane of the camshaft. Since the two end pivot rocker levers must perform a pivoting motion, brought about by the cams or the cam group, relative to the lever pivot, lubricating oil bores for bringing the engine oil together at the corresponding sliding bearing assembly of the end pivot rocker levers are provided thereon.

The disadvantage with this known embodiment is the very complex structural arrangement required to allow a sliding movement of a cam follower.

German Patent DE 196 11 641 C1 furthermore discloses a valve drive for an internal combustion engine, having a camshaft with cams for actuating gas exchange valves, of which at least one cam is provided with a plurality of cam tracks arranged axially in series and is guided on the camshafts in a manner which prevents relative rotation but allows axial movement, and with a lift profile that acts in the direction of the camshaft axis and interacts with at least one actuating element for the axial movement of the cam. The lift profile is formed on the cam, and the actuating element has an actuating pin, which is arranged radially relative to the camshaft and can be brought into or out of engagement with the lift profile in a radially movable manner.

This valve drive of an internal combustion engine allows the actuation of a gas exchange valve with at least two different lift curves. For this purpose, a cam having a plurality of cam tracks is mounted on the camshaft in a manner which prevents relative rotation but allows axial movement. This cam has a lift contour, in which the actuating means engages and thus produces an axial movement of the cam, wherein a switch takes place from one to the other cam track in the axial direction.

The disadvantage with this known system is that a roller-type finger follower is used to actuate the gas exchange valves. However, this roller-type finger follower is relatively expensive, and the rolling-contact mounting could be problematic at extremely high speeds, e.g. those in a motorcycle engine.

To eliminate this disadvantage, German Laid-Open Application DE 10 2016 200 325 A1, which is the starting point of the present invention, discloses a valve drive for an internal combustion engine, having a camshaft, which has a cavity in the axial direction and a cam body for actuating at least one gas exchange valve, wherein the cam body has at least one first and one second, axially adjacent cam track with different gas exchange valve lift tracks and is arranged radially around the camshaft in a manner which prevents relative rotation and allows axial movement. A lift adjustment of the gas exchange valve is performed indirectly via a sliding finger follower. This sliding finger follower is significantly more robust than a roller-type finger follower at extremely high speeds of the internal combustion engine. In this case, the camshaft is rotatably mounted in a camshaft bearing, and the cavity can be filled with a lubricant via a lubricant opening in the camshaft bearing and a first aperture in the camshaft and a second aperture in the cam body, wherein a third aperture is arranged in the camshaft ahead of a cam lobe in the direction of rotation of the camshaft, and a fourth aperture is arranged in the cam body, to enable the lubricant to emerge from the cavity, for intermittent lubrication of the sliding finger follower.

The intermittent lubrication serves for selective oiling of valve actuating means in a manner which is economical in terms of volume flow. Here, oil is supplied only during a valve actuation, and is then no longer supplied. In sliding cam systems, a reliable supply of oil is not ensured. Moreover, expensive mechanical machining operations and compliance with extreme tolerances are required in sliding cam systems in order to avoid troublesome noise during the operation of the internal combustion engine.

It is the object of the present invention to provide a measure which avoids the abovementioned disadvantages.

This and other objects are achieved by a valve drive for a cylinder head of an internal combustion engine, having a camshaft, which is rotatably mounted in a first and a second camshaft bearing and has at least one cam with a first cam lobe and a second cam lobe, which differs from the first cam lobe, wherein a gas exchange valve can be actuated by the first or the second cam lobe via a cam follower. A camshaft section is provided, by which the cam can be moved via an actuator in such a way that the gas exchange valve can be actuated either via the first or the second cam lobe via the cam follower. The camshaft and the cam have a fixed position relative to each other, and the camshaft can be moved axially in the first and the second camshaft bearing. The camshaft bearings each consist of a camshaft bearing block and a common bearing frame. A lubricant supply bore is provided which opens into a fourth lubricant groove in the bearing frame in order to supply the bearing points with lubricant. A first lubricant groove is provided in the first camshaft bearing block, and a second lubricant groove is provided in the second camshaft bearing block, said lubricant grooves corresponding to the fourth lubricant groove and being open in the direction of the cam follower. By way of this embodiment, lubrication of a cam follower, such as a sliding finger follower, is possible for a camshaft that can be moved axially as a whole.

According to a further aspect, a fourth lubricant groove has a fork at the transition to a camshaft bearing block, and the camshaft bearing block has a corresponding third lubricant groove spaced apart by a sliding travel of the camshaft from the second lubricant groove and being open in the direction of the cam follower. Accordingly, lubrication of the cam follower is achieved whatever the position of the camshaft.

According to a further aspect, the camshaft has a fifth lubricant groove which runs around radially on the outside, at least over a certain section, and which corresponds to the second or to the third lubricant groove depending on the position of the camshaft. This enables intermittent lubrication of the cam follower, thus saving lubricant.

Preferably, the cam follower is a sliding finger follower.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
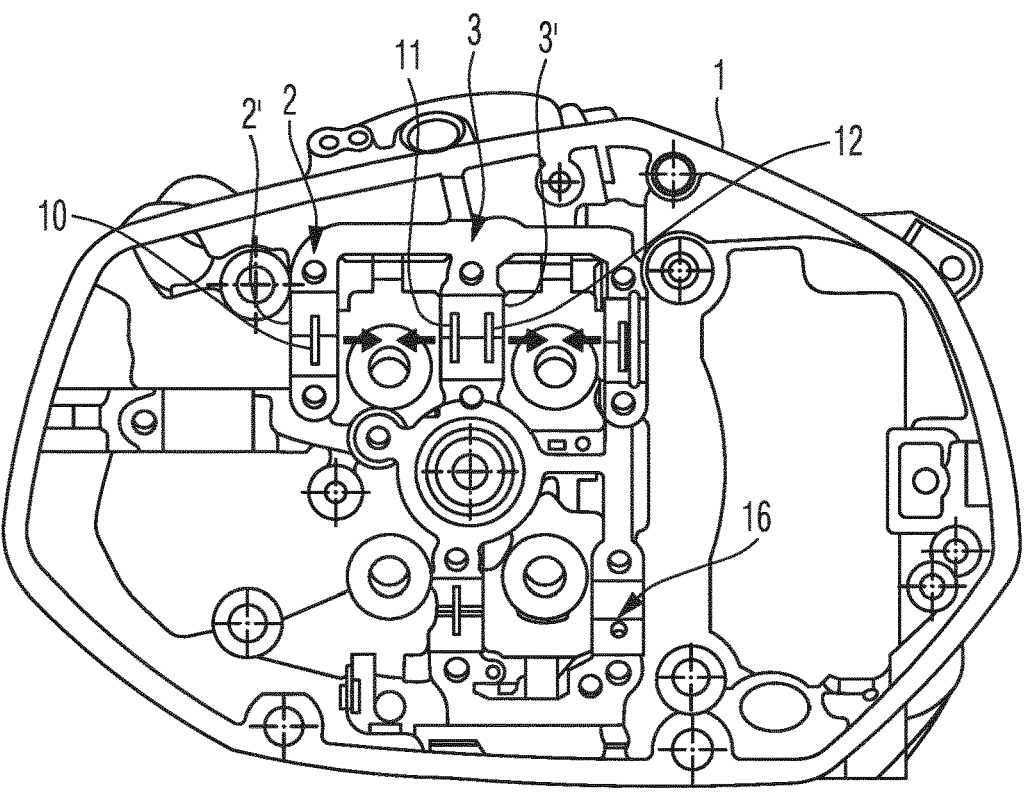
FIG. 1 is a plan view of a cylinder head without the cylinder head cover.
Figure 2:
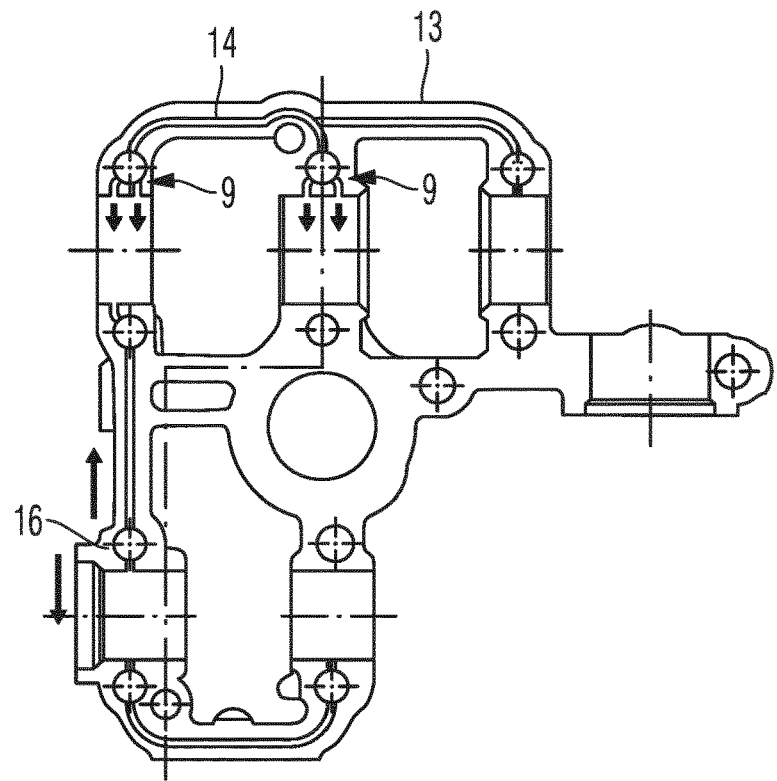
FIG. 2 is a bottom view of a bearing frame.

FIG. 1 shows a plan view of a cylinder head 1 of an internal combustion engine without the valve covers and without the bearing covers, wherein the bearing covers are formed by a bearing frame 13 illustrated in FIG. 2. The valve drive has a camshaft 4, illustrated in FIG. 4, which is rotatably mounted in a first camshaft bearing 2 and in a second camshaft bearing 3 and has at least one cam 5 with a first cam lobe (curve) 6 and a second cam lobe (curve) 7, which differs from the first cam lobe 6. In this case, a gas exchange valve (not illustrated) can be actuated by the first or the second cam lobe 6, 7 via a cam follower (not illustrated). In the embodiment example under consideration, the camshaft 4 is provided for two gas exchange valves, for a single cylinder of the internal combustion engine. Also provided is a camshaft section 8 illustrated in FIG. 4, by which the cam 5 can be moved by a pin, via an actuator (not illustrated), in such a way that the gas exchange valve can be actuated either via the first or the second cam lobe 6, 7 via the cam follower.

The camshaft 4 and the cam 5 have a fixed position relative to each other, and the camshaft 4 can be moved axially in the first and the second camshaft bearing 2, 3. Furthermore, the camshaft bearings 2, 3 each consist of a camshaft bearing block 2', 3' and a common bearing frame 13, illustrated in FIG. 2, wherein a lubricant supply bore 16 is provided in the cylinder head 1, said bore opening into a fourth lubricant groove 14 in the bearing frame 13 in order to supply the bearing points with lubricant. A first lubricant groove 10 is provided in the first camshaft bearing block 2', and a second lubricant groove 11 is provided in the second camshaft bearing block 3', said lubricant grooves 10, 11 corresponding to the fourth lubricant groove 14 and being open in the direction of the cam follower in order to supply lubricant to the cam followers. Moreover, a third lubricant groove 12, which is arranged parallel to the second lubricant groove 11 is provided in the second bearing block 3', said third groove likewise being open toward the cam follower in order to lubricate the cam follower. The spacing between the second lubricant groove 11 and the third lubricant groove 12 corresponds to a sliding travel of the camshaft 4 from the first cam lobe 6 to the second cam lobe 7.

Via a lubricant supply bore 16 in the cylinder head, the fourth lubricant groove 14 in the bearing frame 13 is supplied with lubricant, which is conveyed to the bearing points. To lubricate the cam followers, lubricant emerges from the first camshaft bearing block 2' and the second camshaft bearing block 3'. The emergence of the lubricant is in each case indicated by an arrow.

FIG. 2 shows the associated bearing frame 13 intended to complete the first camshaft bearing 2 and the second camshaft bearing 3. As already explained in relation to FIG. 1, lubricant supply takes place through the lubricant supply bore 16, and the lubricant is carried along further on the outlet side, on the one hand, and on the inlet side, on the other hand, this likewise being indicated symbolically by arrows. In the bearing frame 13, the lubricant is carried along further to the bearing points in the fourth lubricant groove 14, wherein the fourth lubricant groove 14 has a fork 9 ahead of at least one bearing point 2, 3, and therefore the fourth lubricant groove 14 corresponds both to the second lubricant groove 11 and to the third lubricant groove 12. In the embodiment example under consideration, the fork is present for both camshaft bearings 2, 3.

Figure 3:
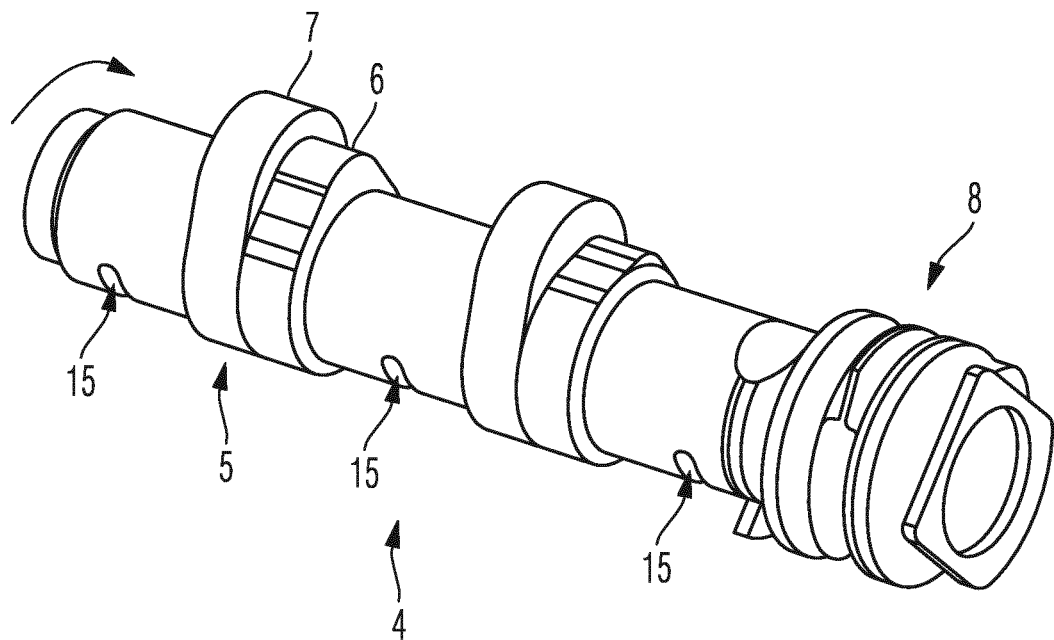
FIG. 3 is a three-dimensionally illustrated camshaft.

FIG. 3 shows a plan view of the three-dimensionally illustrated sliding camshaft 4. A direction of rotation of the camshaft is indicated by an arrow. The camshaft 4 has two cams 5, of which only one is provided with reference signs. The cam 5 has the first cam lobe 6 and the second cam lobe 7, which have different lift curves from one another.

At a camshaft section 8, the entire camshaft 4 can be moved axially into two positions by an actuator (not illustrated).

To deliver the lubricant for lubrication of the cam followers, a fifth lubricant groove 15, which runs around radially, at least over a certain section, is provided in the camshaft 4. If the fifth lubricant groove 15 runs all round, there is continuous lubrication of the cam followers. If the fifth lubricant groove runs around only over a certain section, there is intermittent lubrication of the cam followers, saving lubricant.

Figure 4:
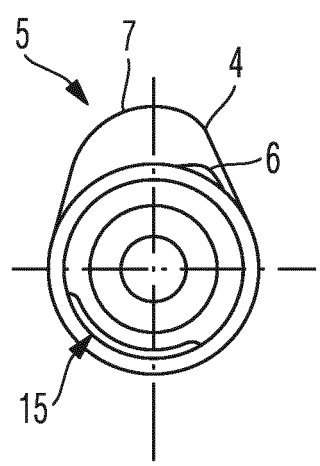
FIG. 4 is a section through the camshaft.

FIG. 4 shows a section through the camshaft 4 with the fifth lubricant groove 15. FIG. 4 also illustrates the cam 5, with the first cam lobe 6 and the second cam lobe 7. Since the movement mechanism of the camshaft 4 is already known from the prior art, it is not explained in detail at this point.

As a particular preference, the cam follower (not illustrated) is a sliding finger follower. The valve drive according to the invention can be arranged both on the inlet side and on the outlet side in the cylinder head 1.

LIST OF REFERENCE SIGNS 1 cylinder head
2 first camshaft bearing
2' first camshaft bearing block
3 second camshaft bearing
3' second camshaft bearing block
4 camshaft
5 cam
6 first cam lobe (curve)
7 second cam lobe (curve)
8 camshaft section 9 fork
10 first lubricant groove
11 second lubricant groove
12 third lubricant groove
13 bearing frame
14 fourth lubricant groove
15 fifth lubricant groove
16 lubricant supply bore The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A valve drive for a cylinder head of an internal combustion engine, comprising:
   a first camshaft mounted rotatably in a first and a second camshaft bearing, the first camshaft having at least one cam with a first cam lobe and a second cam lobe differing from the first cam lobe, wherein a gas exchange valve is actuatable by the first or the second cam lobe via a cam follower, wherein
   the first camshaft has a camshaft section by which the cam is movable via an actuator such that the gas exchange valve is actuatable either via the first or the second cam lobe via the cam follower,
   the first camshaft and the cam have a fixed position relative to each other,
   the first camshaft is movable axially in the first and the second camshaft bearings,
   the first and the second camshaft bearings comprise a camshaft bearing block and a common bearing frame,
   a lubricant supply bore opens into a fourth lubricant groove in the common bearing frame in order to supply bearing points with lubricant,
   a first lubricant groove is arranged in the first camshaft bearing block and a second lubricant groove is arranged in the second camshaft bearing block,
   the first and second lubricant grooves are arranged corresponding to the fourth lubricant groove in the common bearing frame and are open in a direction of the cam follower,
   the fourth lubricant groove has a fork at a transition to a camshaft bearing block, and
   the camshaft bearing block has a corresponding third lubricant groove, which is spaced apart by a sliding travel of the camshaft from the second lubricant groove and which is open in the direction of the cam follower.

2. The valve drive according to claim 1, wherein
   the camshaft has a fifth lubricant groove, which runs around radially on the outside, at least over a certain section, and which corresponds to the second or to the third lubricant groove, depending on a position of the camshaft.

3. The valve drive according to claim 1, wherein the cam follower is a sliding finger follower.

* * * * *